United States Patent [19]

Schaefer et al.

[11] Patent Number: 4,688,262
[45] Date of Patent: Aug. 18, 1987

[54] EXTERNALLY CONNECTABLE CONTROL UNIT FOR A PORTABLE RADIO

[75] Inventors: Henry A. Schaefer; Terry N. Garner, both of Lynchburg, Va.

[73] Assignee: General Electric Company, Lynchburg, Va.

[21] Appl. No.: 844,152

[22] Filed: Mar. 26, 1986

[51] Int. Cl.$^4$ .......................... H04B 1/38; H04B 1/034
[52] U.S. Cl. ........................................ 455/89; 455/100; 455/128; 455/349; 455/351; 200/61.58 R; 200/161
[58] Field of Search .................... 455/89, 90, 100, 128, 455/347-349, 351; 200/51.09, 61.58 R, 161; 340/539

[56] References Cited

U.S. PATENT DOCUMENTS

| | | | |
|---|---|---|---|
| 4,194,157 | 3/1980 | Uno | 455/348 |
| 4,403,341 | 9/1983 | Hata | 340/539 |
| 4,468,656 | 8/1984 | Clifford et al. | 455/100 |
| 4,593,409 | 6/1986 | Miller | 455/349 |

Primary Examiner—Jin F. Ng
Attorney, Agent, or Firm—Nixon & Vanderhye

[57] ABSTRACT

An externally connectable control unit for a portable radio includes an array of contacts matching a similar array of contacts on a portable radio. At lest one control switch is electrically connected with such connector contacts and disposed internally of a switch housing structure. The internal switch is located in association with a recess formed in the housing and a removable plug is friction-fitted within the recess so as to establish a first electrical condition of the control switch—but which is also capable of being manually pulled out of the recess to establish a second electrical condition of the control switch. The meaning to be associated with the switch is determined by a programming device in the control unit which interfaces with the portable radio circuits and is utilized to perform predetermined radio functions. One or more additional switches may also be located on the switch housing (e.g., externally) so as to provide additional convenient control over still other radio functions identified or "programmed" by a predetermined impedance built into the control unit and connected across a pair of its connector contacts.

7 Claims, 4 Drawing Figures

U.S. Patent  Aug. 18, 1987  4,688,262
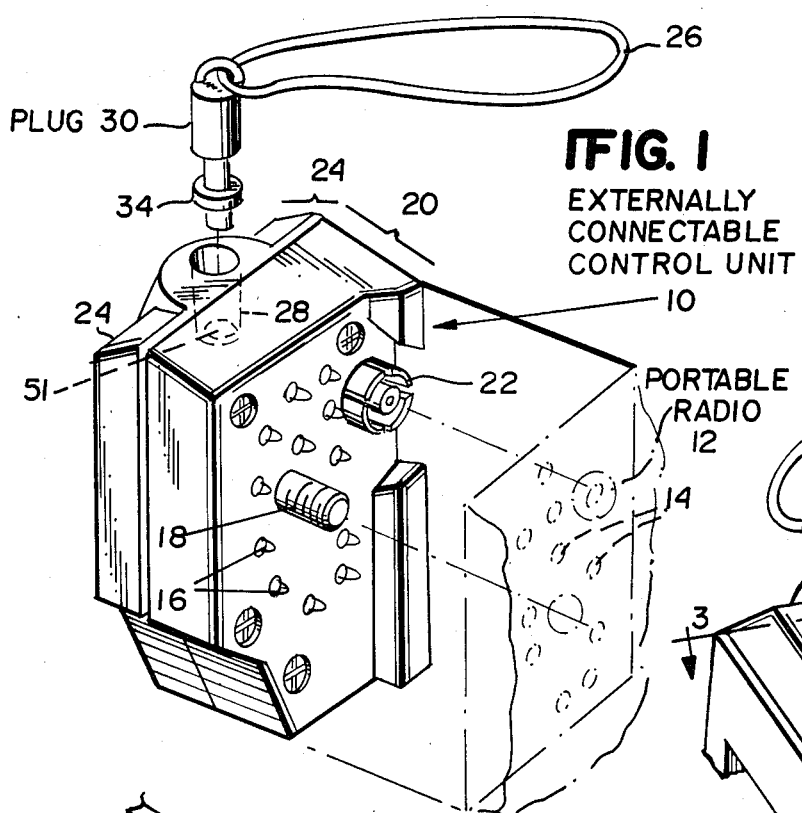
FIG. 1 EXTERNALLY CONNECTABLE CONTROL UNIT
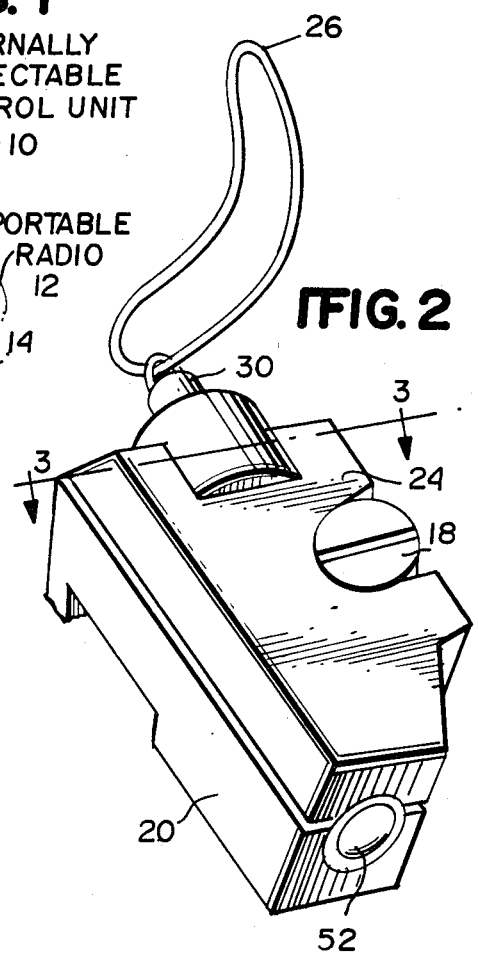
FIG. 2
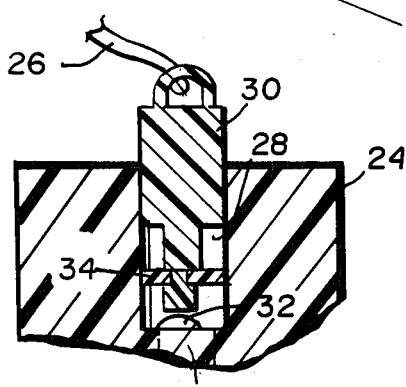
FIG. 3
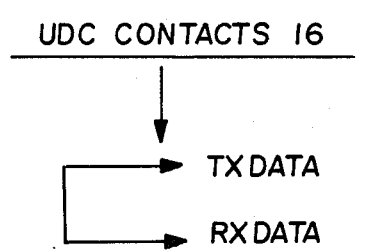
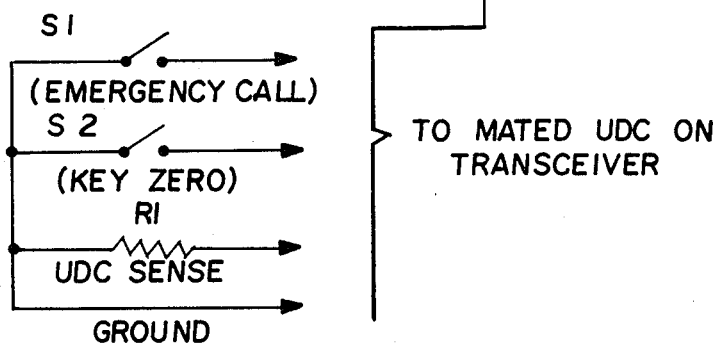
FIG. 4

EXTERNALLY CONNECTABLE CONTROL UNIT FOR A PORTABLE RADIO

This application is generally directed to externally disposed control units for portable radio systems having externally accessible multi-point electrical connectors for connecting associated accessory devices. It is particularly related to an accessory device for quickly and surely signalling emergency conditions.

This application is related to common assigned copending U.S. patent applications Ser. Nos. 844,158 (filed 3/26/86); 847,685 (filed 4/3/86) and 807,645, filed Dec. 11, 1985. Copending application Ser. No. 807,645 is especially related in that it describes, in greater detail, a portable radio device having an array of externally accessible electrical contacts (a so-called "universal device connector" or "UDC") suitable for use with the externally connectable control unit of the present invention. The contents of application Ser. No. 807,645 is hereby expressly incorporated by reference in the present application.

Portable "personal" radio systems are now common place. They are often hand-held or received within some sort of harness assembly strapped to a user for ready access. Such radios are in demand for a wide variety of uses and for different types of users. Accordingly, special function abilities are often desired which are uniquely associated with particular sub-sets (i.e., for particular applications) of such portable radios.

For various reasons, including economy of manufacture and distribution, it is desirable to package as much of the portable radio system as possible as a "common" entity which may be applicable to all types of anticipated end uses. Special "customizing" features then may be added by virtue of externally connected control units. My prior related copending application Ser. No. 807,645 provides a more detailed description of such portable radio systems wherein the "identity" of a particular type of connected accessory device may be automatically detected by the portable radio microprocessor. Typically, such accessory devices are connected via a "universal device connector" which includes an array of externally accessible electrical contacts on a portable radio device.

The following prior issued United States patents, although not directly relating to portable radio systems, may provide a few (nonexhaustive) examples of some prior art approaches to other problems that may, in hindsight, have some relationship to the present invention:

U.S. Pat. No. 3,458,806—Snow (1969)
U.S. Pat. No. 3,464,012—Webb (1969)
U.S. Pat. No. 3,577,076—Frushour et al (1971)
U.S. Pat. No. 3,943,440—Edwards (1976)
U.S. Pat. No. 4,006,396—Bogut (1977)
U.S. Pat. No. 4,491,792—Bullock et al (1985)

Snow provides a sequential tester for measuring the inter-pin impedances of a multi-pin connector as part of a product quality testing arrangement associated with the manufacture of a connected device.

Webb, Frushour et al, and Edwards each teach various types of electrical signal measuring instruments wherein the range of scale selection and/or sensitivity of the measurement device is automatically determined by a corresponding electrical impedance element associated with and connected concurrently to the measuring device with a measurement probe or the like.

Bogut teaches a universal battery charging apparatus wherein a given type of battery pack includes a uniquely corresponding resistance which is connected with the battery so as to become part of the active battery charging circuit. It thus adapts the battery charger to provide proper charging current and potential for that particular battery pack.

Bullock et al provides a special magnetically actuated sensing switch physically associated with a communications port connector so as to provide a proper enabling signal only when a proper communications cable with magnetic actuator is interconnected with it.

It is also known to provide a remote videotape recorder control where a characteristic resistance is connected across a programming lead to signal which of plural push button switches has been activated.

In brief, summary, rather than provide mechanically switched contact points in association with the universal device connector, in accordance with the present invention each type of connected accessory device has a uniquely assigned value of impedance connected across a dedicated "UDC sense" contact point and a common ground point. The portable radio microprocessor then periodically measures the value of any impedance placed across these terminals and utilizes the remaining contacts of the UDC in a predetermined programmed way uniquely associated with that particular type of accessory device. For example, "open" or "closed" electrical switch contact conditions may be sensed and interpreted as an instruction to perform predefined radio functions (e.g., to initiate an emergency radio call or the like). When a different type of accessory device is connected to the same universal device connector, the radio may associate an altogether different function with the same set of electrical connector contacts (as it will be programmed to do in response to detecting a different impedance connected to the UDC sense line).

While there are no doubt an infinite set of possible designs for such externally connectable control units, we have discovered one arrangement which is believed to be of particular usefulness where the programmed radio function involves response to an emergency situation.

In brief summary, such an emergency function control switch may be located within an internal recess of a switch housing which is compactly associated with the universal device connector itself. Being located internally of the switch housing, the emergency function control switch is protected from inadvertent actuations (and from abient weather conditions).

In normal circumstances, a plug is fitted within the recess and mechanically maintained therein so as to establish and maintain a first electrical condition of the control switch (e.g., "closed"). However, if the plug is manually removed from the recess, then a second electrical condition of the control switch is established and maintained (e.g., "opened") thus signalling the need to perform a predetermined emergency portable radio function.

In the exemplary embodiment, a flexible loop is also attached to the external end of the plug and readily accessible for engagement about an operator's finger so as to facilitate rapid manual removable of the plug from the recess in an emergency situation. One or more suitable fastners are also provided for securing the switch housing and its associated UDC contacts to the portable radio unit.

Additional radio function control switches may also be disposed on the same housing with a manual switch actuator directly accessible externally of the housing for more frequent and routine usage—while also being unobtrusively located to minimize intentional actuation and yet being readily accessible for quick emergency actuation (perhaps in association with simultaneously pulling the plug from the recess and actuating the first electrical switch mechanism).

In the exemplary embodiment, the recess in the switch housing includes a cylindrical portion with the control switch located at the bottom of the recess and having a switch actuator which may be mechanically moved axially with respect to the recess so as to change its electrical condition. The plug may be frictionally fitted with the recess so as to engage and mechanically actuate the switch actuator at the bottom of the recess until the plug is pulled out of the recess (and, in the exemplary embodiment, completely separated from the switch housing structure).

These as well as other objects and advantages of this invention will be better appreciated and understood by carefully reading the following detailed description of a presently preferred exemplary embodiment taken, in conjunction with the accompanying drawings, of which:

FIG. 1 is a perspective view of an exemplary externally connectable control unit in accordance with this invention showing the UDC connector side and the top plug-actuated emergency switch arrangement;

FIG. 2 is a similar perspective view of the unit shown in FIG. 1 but from the opposite side and end so as to show the rear cap portion of the switch housing and a second externally accessible control switch disposed on the bottom end of the housing;

FIG. 3 is a partial cross-sectional view of the emergency control switch and the frictionally fitted/removable plug actuator therefor; and FIG. 4 is a typically exemplary electrical schematic diagram of one type of electrical circuit to be located within the switch housing of FIGS. 1 and 2 between the UDC connector electrical contacts.

An exemplary externally connectable control unit 10 in accordance with this invention is depicted in FIGS. 1 and 2. Also partially depicted in FIG. 1 is a portion of a typical portable radio unit 12 having an array of externally accessible electrical contacts 14. As depicted in FIG. 1, the control unit 10 includes a mated array of plural electrical connector contacts 16 matching the array of contacts 14 on the portable radio 12. Fastening means such as screw 18 is provided for securing the housing of control unit 10 and its associated contacts 16 to the portable radio 12.

One portion 20 of the control unit 10 may comprise a universal device connector configuration common to many different types of externally connectable accessory control units. For example, it may include coaxial connector 22 which may employed if shielded transmission lines for RF and/or IF circuits or the like are involved. A second rear cap portion 24 of the control unit 10 is shown more completely at FIG. 2. Collectively, portions 20 and 24 of the housing also include suitable electrical circuits between various of the UDC contacts 16. For example, one possible arrangement for such an electrical circuit is shown in FIG. 4 (and many more are depicted as examples in my related copending application Ser. No. 807,645).

Thus, as shown in FIG. 4, if the data transmit/receive UDC contacts are shorted together, this may be taken by the radio 12 as an indication that digital data is not to be input or output for this particular control unit 10. On the other hand, the particular impedance value of R1 between the UDC sense contact and the ground contact (which ground contact may be made fact through screw 18) can be interpreted by the microprocessor in portable radio 12 as defining a particular type of accessory or control unit 10.

In the exemplary embodiment, a first switch S1 is provided so as to furnish an emergency call option. Here, when switch S1 is actuated to a predetermined one of its two possible conditions (e.g., by pulling the attached lanyard 26 from the control unit 10), the radio may be programmed to transmit a predetermined emergency message (e.g., digital binary or otherwise). In addition, a second switch S2 may be provided for the purpose of "zeroizing" certain cryptographic "keys" which may be stored in the portable radio for voice scrambling purposes. (Oftentimes, this function is also used in emergency situations.)

As should be understood, switches S1 and S2 are provided in a particular type of control unit 10 (identified by a uniquely associated value of R1) only for customers requiring those specific options. Accordingly, the basic radio package 12 may be allowed to remain relatively small for customers not requiring such options—while permitting other customers to choose different control units 10 associated with different predetermined radio functions.

As may be seen better in FIG. 3, switch S1 is disposed internally of the housing 20/24 and at the bottom of a recess 28 which includes a cylindrical portion such that a plug member 30 may be moved axially with respect to the recess 28 so as to engage or not engage the manual switch acutator 32 of switch S1. As should be appreciated, switch S1 is of the type which changes from one electrical condition to another (i.e., from open to closed or vice versa) depending upon whether its actuator 32 is engaged or not engaged by the inner end of plug member 30.

Plug 30 includes an elastomeric washer or other member 34 mounted thereon and slightly oversized with respect to recess 28 so as to frictionally hold plug 30 therewithin and thus maintain S1 in a predetermined one of its states. (It also serves to provide a water-tight seal protecting switch S1 from ambient weather conditions). However, the other end of plug 30 is attached to a loop of flexible material (lanyard 26) which is easily accessible for engagement about an operator's finger so as to facilitate manual removal of the plug from the recess in an emergency.

For example, when a possibly dangerous situation is anticipated the radio operator could simply insert a finger within loop 26 in readiness. Thereafter, if an actual emergency situation does arise, a virtually fail-safe actuation of switch S1 to its other electrical condition easily can be achieved by simply pulling on loop 26 and thereby pulling plug 30 out of recess 28. Thus, even if someone tries to take the portable radio device 12 away from the legitimate user, plug 30 will automatically be removed from the control unit 10 thus actuating switch S1 and sending the desired emergency message.

In addition, the exemplary embodiment includes a second switch S2 mounted on the opposite end of the control unit 10 in an unobtrusive yet readily accessible position on the external surface of the switch housing.

While only one embodiment of this invention has been described in detail, those skilled in the art will recognize that many possible variations and modifications may be made in the exemplary embodiment while yet maintaining many of the novel features and advantages of this invention. Accordingly, all such modifications and variations are to be included within the scope of the following claims.

What is claimed is:

1. An externally connectable control unit for a portable radio having an array of externally accessible electrical contacts, said control unit comprising:
   an array of plural electrical connector contacts matching the array of externally accessible contacts on the portable radio;
   at least one control switch electrically connected with said array of connector contacts;
   a switch housing having said array of contacts disposed externally thereon and also having said control switch disposed internally therewithin in association with a recess formed in the housing; and
   a removable plug means fitted within said recess to establish a first electrical condition of said control switch and which plug means is capable of being manually pulled out of the recess to establish a second electrical condition of the control switch.

2. An externally connectable control unit as in claim 1 wherein (1) said recess includes a cylindrical portion, (2) said control switch is mounted at the bottom of said recess and includes a switch actuator which may be mechanically moved axially with respect to said recess so as to change the electrical condition of the switch, and (3) said plug means is frictionally fittable into said recess so as to engage and mechanically actuate said switch actuator.

3. An externally connectable control unit as in claim 1 wherein said plug means is separable from said housing.

4. An externally connectable control unit as in claim 1 wherein said plug means includes a flexible loop connected to it and accessible for engagement about an operator's finger so as to facilitate rapid and fail-safe manual removal of the plug means from the recess in an emergency.

5. An externally connectable control unit as in claim 1 further comprising a second control switch disposed on said housing and having a manual actuator directly accessible externally of said housing.

6. An externally connectable control unit as in claim 1 wherein said array of connector contacts includes a fastening means for securing said housing and its associated contacts to said portable radio.

7. An externally connectable control unit for a portable radio having an aray of externally accessible electrical contacts, said control unit comprising:
   a housing;
   a multi-contact electrical connector located on said housing and mated with said array of contacts on the radio and respectively engagable therewith;
   an electrical impedance of predetermined value electrically connected across a pair of the connector's contacts internally of said housing;
   a switch connected internally of the housing across a pair of the connector's contacts, said switch being manually actuatable between first and second electrical states upon acuator movements along a predetermined axis;
   a cylindrical recess in said housing, said switch being disposed at the bottom of the recess;
   a plug frictionally fitted within said recess and engaging said switch so as to maintain it in a first electrical state; and
   a lanyard attached to one end of said plug to facilitate its removal from the recess so as to change the switch to its second electrical state.

* * * * *